Jan. 21, 1969     P. L. POWELL     3,422,684
SPEEDOMETER
Filed Jan. 20, 1966
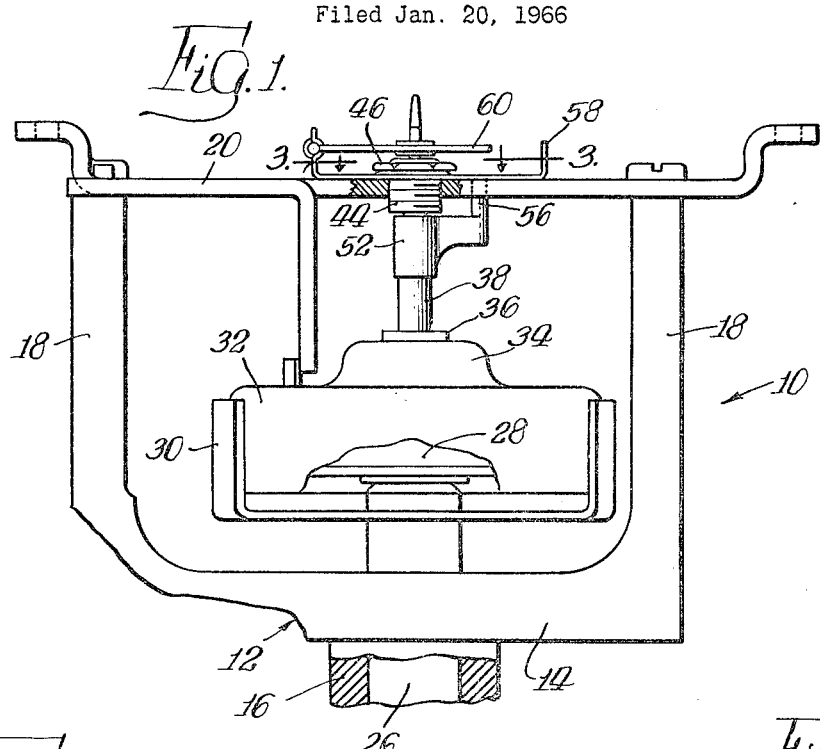
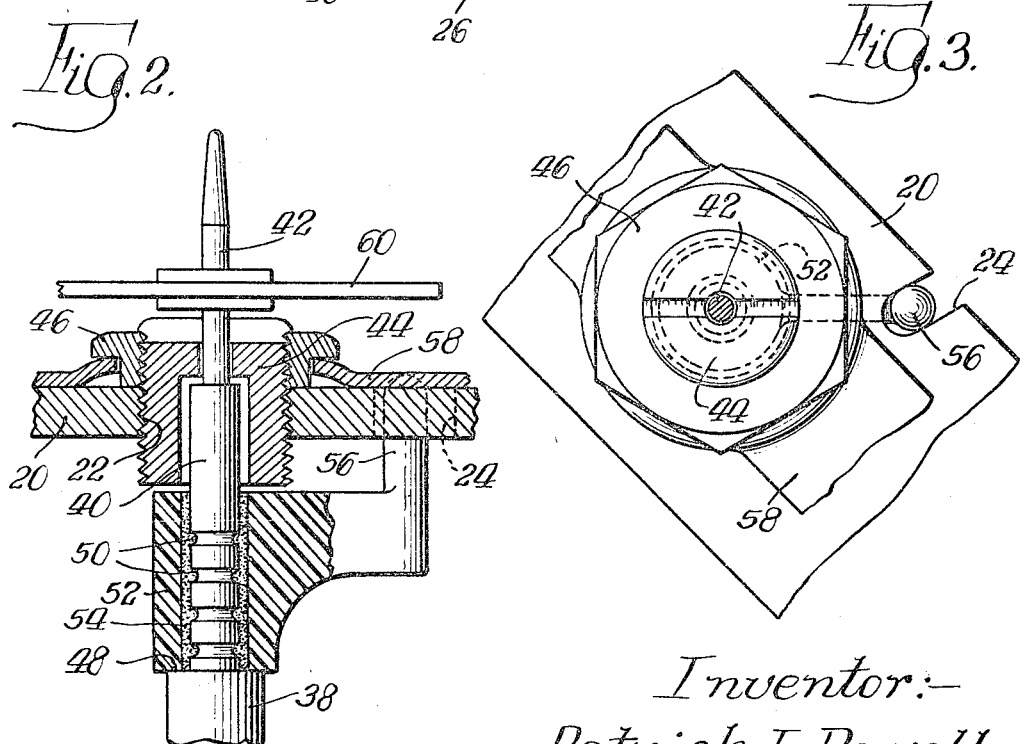
Inventor:—
Patrick L. Powell,
By Norton Lesser
Atty.

United States Patent Office 3,422,684
Patented Jan. 21, 1969

3,422,684
SPEEDOMETER
Patrick L. Powell, Franklin Park, Ill., assignor to Stewart-Warner Corporation, Chicago, Ill., a corporation of Virginia
Filed Jan. 20, 1966, Ser. No. 521,950
U.S. Cl. 73—496
Int. Cl. G01p 3/22
2 Claims

ABSTRACT OF THE DISCLOSURE

The following specification describes a speedometer having a spindle on which both a shoulder and plurality of grooves are formed adjacent the outer bearing. A sleeve encircles the grooves and butts against the shoulder to confine a viscous damping fluid between the sleeve and pointer shaft. An offset arm on the sleeve engages in a support member carrying the bearing and prevents rotation of the sleeve.

---

The present invention relates generally to a speedometer of the magnetic type and more particularly to damping means for the indicator spindle thereof.

In a magnetic type speedometer, a speed cup, which encircles a rotatable magnet, is secured to a rotatably mounted indicator spindle which carries an indicating pointer. Rotation of the magnet within the speed cup sets up a magnetic field which exerts a force causing the speed cup to revolve to a point where the magnetic force is balanced by the retarding force of a hair spring attached to the indicator spindle.

It is an object of the present invention to provide means for damping the indicator spindle of a vehicle speedometer whereby to reduce oscillations of the pointer resulting from vibrations received by the speedometer, to prevent over swing of the pointer during acceleration of the vehicle, and to prevent under or over swing of the pointer caused by centrifugal forces during turning of the vehicle.

It is another object of the present invention to provide damping means, as described, which may be incorporated in conventional speedometer constructions with minor modifications therein.

Now in order to acquaint those skilled in the art with the manner of constructing and using speedometers incorporating the principles of the present invention, there will be described in connection with the accompanying drawing a preferred embodiment of the invention.

In the drawing:

FIGURE 1 is a fragmentary elevational view, with portions being broken away and shown in section, of a speedometer incorporating the principles of the present invention;

FIGURE 2 is a fragmentary sectional view, on an enlarged scale, of the forward portion of the speedometer of FIGURE 1; and FIGURE 3 is a fragmentary end view, on an enlarged scale, taken substantially along the line 3—3 in FIGURE 1, looking in the direction indicated by the arrows.

Referring now to the drawing, there is indicated generally by the reference numeral 10 a speedometer comprising a main frame 12 having a transverse wall portion 14, an axially extending tubular portion 16, and laterally spaced axially extending side arm portions 18. Suitably secured to the ends of the side arm portions 18 is a support member or bracket 20 having a central threaded opening 22 and an adjacent slot 24 open on one side. The main frame 12 and the support member 20 define frame means for the speedometer 10.

Rotatably mounted in the tubular portion 16 of the main frame 12 is a magnet shaft 26. The outer end of the magnet shaft 26 is adapted to be connected, for example, to a vehicle transmission through a flexible shaft (not shown). The inner end of the magnet shaft 26 has secured thereon a transverse bar magnet 28 and a generally C-shaped field plate 30. Encircling the bar magnet 28 within the boundary of the field plate 30 is a speed cup 32 which is fabricated of a non-magnetic material such as aluminum. The central axially offset portion 34 of the speed cup 32 is press fitted through a bushing 36 on an indicator spindle 38.

The spindle 38 is formed with an intermediate section 40 of reduced diameter, and with an outer end section 42 of still further reduced diameter. The outer spindle end 42 is rotatably mounted in an axially adjustable bearing member 44 threaded in the opening 22 of the support member 20. A lock nut 46 serves to secure the bearing member 44 in proper axial position. The junction of the intermediate spindle section 40 with the main body portion of the spindle serves to provide an annular shoulder 48 which is axially spaced from and faces the bearing member 44. The intermediate spindle section 40 is also formed with a plurality of axially spaced annular grooves 50.

Encircling the grooved portion of the intermediate spindle section 40 is a floating plastic damper sleeve 52. The sleeve is axially located against the spindle shoulder 48 and extends substantially to the bearing member 44. A minimum clearance of .001 inch is maintained between the spindle section 40 and the sleeve 52. Confined in this space is a viscous damping liquid 54 such as silicone fluid having a viscosity of 150,000 centistokes. The required amount of damping liquid 54 is wiped on the spindle section 40 and in the grooves 50 immediately prior to assembly of the sleeve member 52 on the spindle. The grooves 50 serve to equalize distribution of the damping liquid along the spindle section 40 while the abutting shoulder 48 serves to prevent leakage of the damping liquid from the sleeve. To index and prevent rotation of the sleeve member 52, the latter is provided with an offset axial arm portion 56 that is engaged in the slot 24 of the support member 20.

A strip member 58 is interposed between the support member 20 and the lock nut 46. In a conventional manner, a spiral hair spring 60 is connected at one end to the strip member 58 and at the other end to the indicator spindle section 42, while an indicating pointer (not shown) is secured to the outermost end of the spindle section 42. During rotation of the magnet shaft 26 and magnet 28, a magnetic field is set up which exerts a magnetic force on the speed cup 32 causing it to revolve in the same direction. The speed cup and indicator spindle 38 rotate to a point where the magnetic force is balanced by the retarding force exerted by the hair spring 60. When rotation of the magnet 28 stops, the speed cup is returned to its rest position by the hair spring 60.

In the operation of the speedometer, the viscous damping liquid 54 produces damping on the indicator spindle section 40. By reason of such damping, undesirable flutter of the indicator spindle and indicating pointer, under and over swing of the pointer, and other extraneous movements thereof are eliminated or minimized. In addition, by arranging the damping means at an intermediate location along the indicator spindle, the damping means may be incorporated in a conventional speedometer construction with only minor modifications herein.

While there has been shown and described a preferred embodiment of the present invention, it will be understood by those skilled in the art that various rearrangements and modifications may be made therein without departing from the spirit and scope of the invention.

I claim:
1. For use in a speedometer or the like having frame means with at least one support member, and bearing means secured in the support member, the combination of an indicator spindle rotatably mounted in the bearing means, a sleeve member encircling a portion of said indicator spindle adjacent the bearing means, a viscous damping liquid intermediate said indicator spindle and said sleeve member for producing damping on said indicator spindle, and an annular shoulder on said indicator spindle axially spaced from and facing the bearing means, and wherein said sleeve member is axially located against said shoulder.

2. For use in a speedometer or the like having frame means with at least one support member, and bearing means secured in the support member, the combination of an indicator spindle rotatably mounted in the bearing means, a sleeve member encircling a portion of said indicator spindle adjacent the bearing means, a viscous damping liquid intermediate said indicator spindle and said sleeve member for producing damping on said indicator spindle said indicator spindle is formed with axially spaced annular grooves within the confines of said sleeve member, an annular shoulder on said indicator spindle axially spaced from and facing the bearing means, said sleeve member axially located against said shoulder and extending substantially to the bearing means, and an offset axial arm portion on said sleeve member that engages the support member for preventing rotation of said sleeve member.

References Cited
UNITED STATES PATENTS

| 1,857,674 | 5/1932 | Zubaty | 73—520 XR |
| 2,569,311 | 9/1951 | Hoare et al. | 73—430 |
| 2,768,798 | 10/1956 | Johnston et al. | 188—90 XR |
| 3,196,692 | 7/1965 | Jensen | 73—496 |

JAMES J. GILL, *Primary Examiner.*

U.S. Cl. X.R.

73—519